(12) United States Patent
Beaux, II et al.

(10) Patent No.: US 11,027,816 B1
(45) Date of Patent: Jun. 8, 2021

(54) AIR-BUOYANT STRUCTURES AND VEHICLES

(71) Applicant: Triad National Security, LLC, Los Alamos, NM (US)

(72) Inventors: Miles Frank Beaux, II, Los Alamos, NM (US); Igor Olegovich Usov, Los Alamos, NM (US); Brian M. Patterson, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 331 days.

(21) Appl. No.: 15/997,163

(22) Filed: Jun. 4, 2018

Related U.S. Application Data

(60) Provisional application No. 62/515,469, filed on Jun. 5, 2017.

(51) Int. Cl.
*B64B 1/58* (2006.01)
*B64B 1/44* (2006.01)

(52) U.S. Cl.
CPC ............... *B64B 1/58* (2013.01); *B64B 1/44* (2013.01); *B64C 2201/022* (2013.01)

(58) Field of Classification Search
CPC ............... B64B 1/58; B64B 1/44; B64B 1/00; B64B 1/06; B64B 1/40; B64B 1/60; B64C 2201/022
See application file for complete search history.

(56) References Cited

U.S. PATENT DOCUMENTS

| | | | |
|---|---|---|---|
| 1,390,745 A | 9/1921 | Armstrong | |
| 4,534,525 A * | 8/1985 | Bliamptis | B64B 1/58 136/292 |
| 6,423,387 B1 * | 7/2002 | Zollinger | A61K 49/1815 220/592.2 |
| 6,432,176 B1 * | 8/2002 | Klos | B82Y 30/00 206/0.7 |
| 6,828,001 B2 * | 12/2004 | Tokonabe | B32B 3/12 428/69 |
| 9,305,280 B1 | 4/2016 | Berg et al. | |
| 2007/0001053 A1 * | 1/2007 | Akhmeteli | B64B 1/06 244/125 |

(Continued)

OTHER PUBLICATIONS

Aerogel.org website available at http://www.aerogel.org/?p=3 (last accessed May 3, 2018).

(Continued)

*Primary Examiner* — Valentina Xavier
(74) *Attorney, Agent, or Firm* — LeonardPatel PC; Michael A. Leonard, II; Sheetal S. Patel

(57) ABSTRACT

Air-buoyant structures, and vehicles incorporating air-buoyant structures, are provided. Hollow, air-buoyant structures may include a shell of ultra-low density aerogel material, foam material, or vapor-expanded material that is strong and stiff enough to withstand atmospheric pressure and lightweight enough to achieve buoyancy in air under evacuation. The shell may be reinforced with a suitable reinforcing material, such as helical nanofibers. The air-buoyant structures may also include vacuum pumps and valves operably connected to or integrated with the hollow shell. The vacuum pumps and valves may be configured to pump air out of the hollow shell and allow air back into the hollow shell to control buoyancy.

19 Claims, 13 Drawing Sheets

(56) References Cited

U.S. PATENT DOCUMENTS

2013/0126675 A1* 5/2013 Heppe .................... G01M 3/16
 244/126
2014/0276711 A1* 9/2014 Duong .................. A61B 18/02
 606/25

OTHER PUBLICATIONS

Expancel Microspheres Brochure available at https://expancel.akzonobel.com/siteassets/20170606-download-expancel-expancel-worlds-favorite-secret-ingredient.pdf (last accessed May 4, 2018).

Huihui Wu et al., "Studies of Interfacial Interaction between Polymer Components on Helical Nanofiber Formation via Co-Electrospinning," Polymers 10, 119 (2018).

New Atlas DARPA Roughing Pump Article available at https://newatlas.com/darpa-mems-smallest-vacuum-pumps/27883/ (last accessed May 3, 2018).

Silica Nanosprings Product Sheet available at https://www.strem.com/uploads/technical_notes/14-6052tech.pdf (last accessed May 4, 2018).

Wikipedia Aerogel Page available at https://en.wikipedia.org/wiki/Aerogel (last accessed May 3, 2018).

Wikipedia Roughing Pump Article available at https://en.wikipedia.org/wiki/Roughing_pump (last accessed May 3, 2018).

* cited by examiner

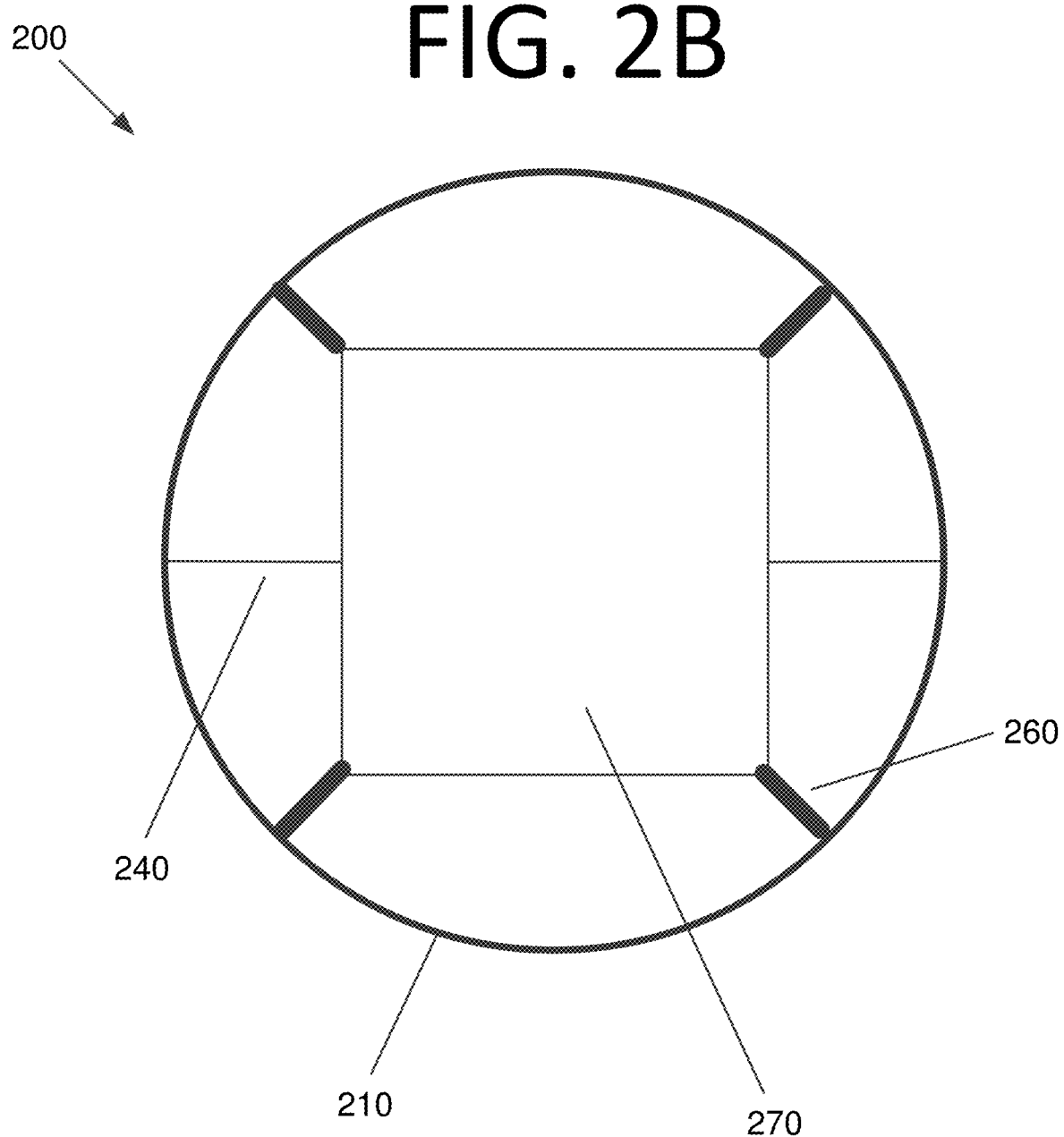

AIR-BUOYANT STRUCTURES AND VEHICLES

CROSS-REFERENCE TO RELATED APPLICATION

This application claims the benefit of U.S. Provisional Patent Application No. 62/515,469 filed Jun. 5, 2017. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to air-buoyant technologies, and more particularly, to air-buoyant structures and vehicles incorporating such air-buoyant structures.

BACKGROUND

Conventional air-buoyant systems, such as balloons, blimps, and the like, have become more expensive to utilize due to the ever-increasing expense of helium gas, which is becoming increasingly scarce. Also, in the case of balloons, rupture at maximum altitude often occurs, resulting in payloads falling in an uncontrolled manner, and possibly into undesirable or dangerous locations (e.g., populated areas, remote locations, private property, etc.). Furthermore, partially filled balloons eventually lose buoyancy and also land in uncontrolled locations. Furthermore, the longest operational duration that has been achieved for helium balloons is approximately two years. Potential industrial ballooning applications also are not practical using conventional technologies since they generally require more permanent deployment of balloon payloads. Accordingly, an improved approach to air-buoyant systems may be beneficial.

SUMMARY

Certain embodiments of the present invention may provide solutions to the problems and needs in the art that have not yet been fully identified, appreciated, or solved by conventional air-buoyant technologies. For example, some embodiments pertain to air-buoyant structures and vehicles incorporating such air-buoyant structures.

In an embodiment, an air-buoyant structure includes a shell that includes an aerogel material, a foam material, a vapor-expanded material, or any combination thereof. The air-buoyant structure also includes a cavity defined by the shell and located within the shell that is under reduced pressure conditions as compared to atmospheric pressure at a specific altitude.

In another embodiment, an air-buoyant vehicle includes a shell. The air-buoyant vehicle also includes a cavity defined by the shell and located within the shell. The air-buoyant vehicle further includes a plurality of vacuum pumps and valves operably connected to or integrated with the shell. The plurality of vacuum pumps and valves are configured to pump air out of and allow air into the cavity to control buoyancy of the shell.

In yet another embodiment, an air-buoyant platform includes a platform and a plurality of air-buoyant structures operably connected to the platform. The air-buoyant structures, when evacuated, are configured to lift the air-buoyant platform into the air.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2B is a magnified top view illustrating a scientific payload of the torus-shaped air-buoyant vehicle of FIG. 2A, according to an embodiment of the present invention.

DETAILED DESCRIPTION OF THE EMBODIMENTS

Figure 1A:
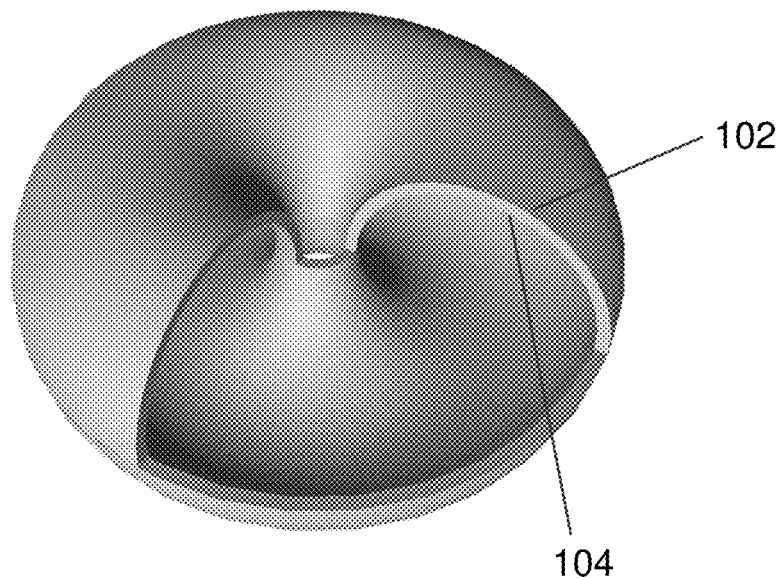
FIG. 1A is a perspective partially cutaway view illustrating a torus-shaped air-buoyant structure, according to an embodiment of the present invention.

Some embodiments of the present invention pertain to air-buoyant structures and vehicles incorporating such air-buoyant structures. For instance, hollow structures may be constructed that include a shell of ultra-low density aerogel material, a foam material, or a vapor-expanded material (e.g., silica-based, resorcinol formaldehyde-based, or carbon-based aerogels) that is strong and stiff enough to withstand atmospheric pressure and light weight enough to achieve buoyancy in air under evacuation (i.e., a vacuum balloon). In some embodiments, ultralight aerogel materials such as those provided by Airloy™ (e.g., ultralight ceramics, polymers, carbon, or metals and carbides) may be used. In certain embodiments, ultra-low density foam materials may be used. However, any suitably strong material, such as light metals or alloys, carbon fiber composites, etc., may be used without deviating from the scope of the invention. For instance, some embodiments may utilize helical nanofiber reinforced composite structures (e.g., Silica Nanosprings™ by STREM).

In certain embodiments, vapor-expanded materials, such as Expancel Microspheres™, may be used. These materials are filled with a liquid that vaporizes when exposed to heat, causing microspheres containing the material to expand.

Such structures operate via the opposite principle of a gas-filled balloon. More specifically, rather than the balloon containing gas internally and keeping gas from escaping in substantial quantities (at least for a time), embodiments of the present invention utilize hollow structures with internal cavities under lower pressure or vacuum conditions that keep air from the atmosphere from entering the structure in substantial quantities. Some embodiments also are capable of pumping air out of the structures and allowing air back into the structures, controlling buoyancy. It should be noted that multiple air-buoyant structures may be tethered together or otherwise incorporated into one application in order to increase overall buoyancy. This may be particularly useful for large applications or those requiring significant lifting capabilities, where manufacturing a monolithic air-buoyant structure to achieve this purpose may be difficult, cost-prohibitive, or impossible with current technologies.

The structures may be torus-shaped, pill-shaped, spherical, cylindrical, a more complex structure (or structures) formed from interconnected tubes of the same or variable width, a lattice support matrix, or any suitable structure or structures that are air-buoyant when at least some air is pumped out of the inside of the structure(s) without deviating from the scope of the invention. For instance, some non-limiting examples of geometries that may be used in some embodiments can be found in U.S. Pat. Nos. 1,390,745 and 4,534,525 and U.S. Patent Application Publication No. 2007/0001053. Removal of internal gases (i.e., evacuation) may be achieved with the use of an onboard pump. While some embodiments may be produced with the air already pumped out of the structure and sealed, using onboard pumps provides more control and utility, and may allow for more complex structures, or combinations of structures, to be built and deployed. Indeed, structures or combinations of structures may be produced that conform to a payload, a vehicle body, etc.

For onboard pumps, some embodiments may employ one or more roughing pumps to remove air from the structure. A roughing pump, as its name implies, is a vacuum pump used to evacuate a sufficient amount of air to achieve a "rough vacuum" (typically above $1 \times 10^{-3}$ torr (0.1 Pascals). These roughing pumps may be miniature roughing pumps in some embodiments. Such miniature roughing pumps may be similar to penny-sized roughing pumps developed for DARPA, for instance. Some embodiments may employ turbo pumps or other vacuum pump technologies to achieve a higher vacuum (e.g., high vacuum, ultra-high vacuum, or extremely high vacuum). However, the benefits to buoyancy of achieving vacuum conditions beyond "rough vacuum" are typically minimal, at best.

The vacuum, rough vacuum, or reduced pressure environment within the structure eliminates the need for filling the structure with lighter gases to achieve buoyancy. This also has the further benefit of making the structure cheaper, and if an explosive gas like hydrogen is used, potentially safer. Indeed, no gas is cheaper than nothing at all. Also, long-term or permanent operation may be realized. The many practical applications of various embodiments include, but are not limited to, balloon-suspended Wi-Fi hot spots (such as those needed for Project Loon™), a helium-free alternative for floating warehouses (e.g., those envisioned by Amazon), air-buoyant delivery vehicles, air-buoyant servicing vehicles, cargo transport vehicles, blimps, high altitude algae-based biodiesel production platforms enhanced by ultraviolet light intensive environment, agricultural surveillance vehicles, scientific and industrial balloons, a high altitude platform for launching space vehicles and delivering rockets to the platform, potentially reducing launch costs, etc.

When developing an air-buoyant structure, some embodiments use hollow geometries that minimize the surface area-to-volume ratio of the structure. However, any desired hollow structure that achieves a lower overall density than air may be used without deviating from the scope of the invention. At sea level and a temperature of 15° C., air has a density $\rho_{air}$ of approximately 1.225 kg/m$^3$ (i.e., 1225.0 g/m$^3$, 0.0023769 slug/ft$^3$, 0.0765 lb/ft$^3$, etc.).

The density of the structure depends on the material and shape that is used. The densities of some high strength materials are provided below.

TABLE 1

DENSITIES OF EXAMPLE HIGH STRENGTH MATERIALS

| Material: | Density (g/cm$^3$) |
|---|---|
| Carbon Fiber (Unidirectional)/Epoxy (Standard Modulus) | 1.55 |
| Carbon Fiber (Unidirectional)/Epoxy (Intermediate Modulus) | 1.57 |
| Carbon Fiber (Unidirectional)/Epoxy (Intermediate Modulus) | 1.59 |
| Carbon Nanotubes (CNTs) | Up to 1.6 |
| Aluminum (6061-T6) | 2.7 |
| Titanium (6M-4V) | 3.34 |
| Steel (4130) | 7.7 |
| Aerogels | 0.0011 to ~0.5 |
| Airloy ™ Series X50 | 0.1 to 0.6 |
| Airloy ™ Series X60 | 0.2 to 0.6 |
| Airloy ™ Series X100 | 0.1 to 0.6 |
| Airloy ™ Series X110 | 0.05 to 0.7 |
| Airloy ™ Series X400 | 0.4 to 1.0 |
| Air (at sea level and 15° C.) | 0.001225 |

Aerogels are synthetic, porous, solid materials that have extremely low densities. Densities in aerogel materials vary based on the material that is used and the porosity of the aerogel. Volumetrically, aerogels are typically 95-99% air, with one produced aerogel being 99.98% air in volume. The air is trapped in pores within the aerogel, and the pores may range in diameter from less than one nanometer (nm) to approximately 100 nm, with a typical diameter being less than 20 nm. For vacuum-filled buoyant structures, the strength of the aerogel and width of the shell should be sufficient to not be crushed by the external pressure applied by the atmosphere. At higher altitudes, this pressure would naturally be less.

The altitude that the structure may reach is thus the altitude where the density of the overall evacuated structure is equal to the density of an equivalent volume of the surrounding air. Thus, a balloon designed to reach 25 miles of altitude may need to be considerably less dense than one designed to reach lower altitudes. This may be accomplished by increasing the size of the internal volume of the structure.

The shape of the structure should also be taken into consideration. For instance, for a torus-shaped structure, the overall density of the vacuum "balloon" $\rho_T$ is given by $$\rho_T = \frac{(r_o^2 - r_i^2)\rho_s}{r_o^2} \tag{1}$$

where $\rho_s$ is the density of the material used to make the structure, $r_o$ is the outer radius of the torus "tube" (i.e., the radius from the center to the outside edge of the tube), and $r_i$ is the inner radius of the torus tube (i.e., the radius from the center to the inner edge of the tube). See torus structure 100 of FIG. 1A, which includes an outer side 102 and inner side 104 of an outer wall. Thus, the thickness t of the material used to make the torus shell is given by:

$$t = r_o - r_i \tag{2}$$

A torus is essentially a circle some distance from a center point that has been rotated 360° about a coplanar axis, where the circle does not overlap the axis (but may intersect it in the case of a horn torus). For any given volume, the minimum surface area-to-volume ratio is provided by a sphere. However, for a fixed radius R, a torus geometry provides a minimum surface area-to-volume ratio of 2/R, where R represents the radius of a sphere, cylinder, or tube of a curved tube geometry. These geometric considerations enable a minimum amount of material to displace the maximum volume of air, thus optimizing buoyancy under evacuation.

Figure 1B:
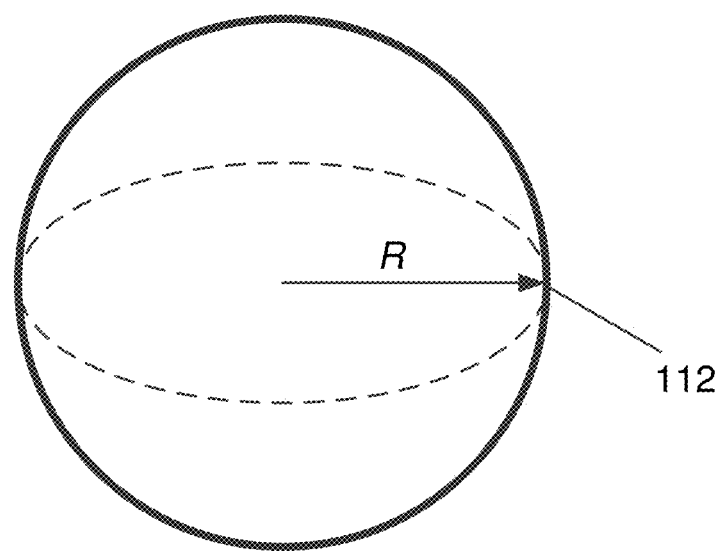
FIG. 1B is a side view illustrating a spherical air-buoyant structure, according to an embodiment of the present invention.

For a sphere, the surface area-to-volume ratio is given by:

$$\frac{SA}{V} = \frac{4\pi R^2}{\frac{4}{3}\pi R^3} = \frac{3}{R} \tag{3}$$

where SA is surface area and V is volume. See sphere structure 110 of FIG. 1B, where R extends from the center of sphere structure 110 to the outside of shell 112. For a cylinder, the surface area-to-volume ratio is given by:

$$\frac{SA}{V} = \frac{2\pi RL + 2\pi R^2}{\pi R^2 L} = \frac{2}{R} + \frac{2}{L} \tag{4}$$

Figure 1C:
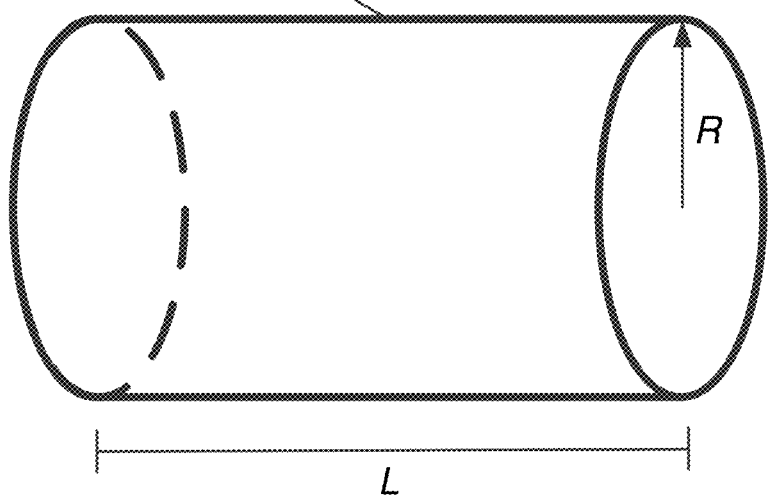
FIG. 1C is a side view illustrating a cylindrical air-buoyant structure, according to an embodiment of the present invention.

See cylinder structure 120 of FIG. 1C, where R extends from, and perpendicular to, the concentric center of structure 120 to the outside of shell 122 and L extends parallel to the concentric center of structure 120 from the outside of shell 122 at one end of cylinder structure 120 to the outside of shell 122 at the opposite end of cylinder structure 120. For a torus, the surface area-to-volume ratio is given by:

$$\frac{SA}{V} = \frac{(2\pi R)(2\pi r)}{(\pi R^2)(2\pi r)} = \frac{2}{R} \tag{4}$$

where R is the radius of the torus shell, and r is the radius of the curvature of the torus shell (i.e., the distance from the center of the "donut hole" to the center of the tube that wraps around the "donut hole").

For a pill shape, this can be thought of conceptually and volumetrically as a sphere of the same radius as a cylinder that is divided into hemispheres, and the hemispheres are then placed at each end of the cylinder. As such, the surface area-to-volume ratio is given by:

$$\frac{SA}{V} = \frac{2\pi RL + 4\pi R^2}{\pi R^2 L + \frac{4}{3}\pi R^3} = \frac{2}{R} \cdot \frac{(L + 2R)}{\left(L + \frac{4}{3}R\right)} \tag{6}$$

Figure 1D:
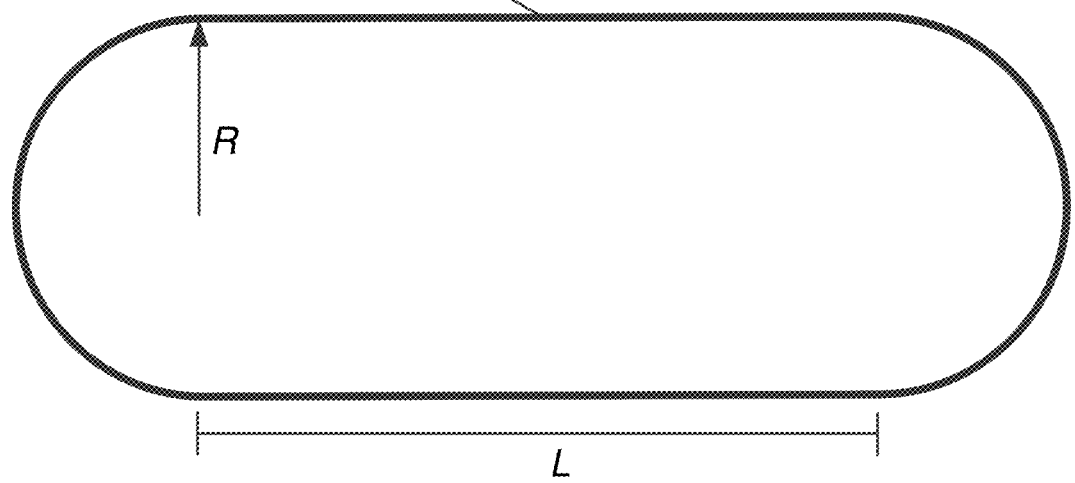
FIG. 1D is a side view illustrating a pill-shaped air-buoyant structure, according to an embodiment of the present invention.

See pill-shaped structure 130 of FIG. 1D, where R is the radius of the "nested" cylinder and the hemispheres from the center of structure 130 to the outside of shell 132 and L is the length of the nested cylinder.

Figure 1E:
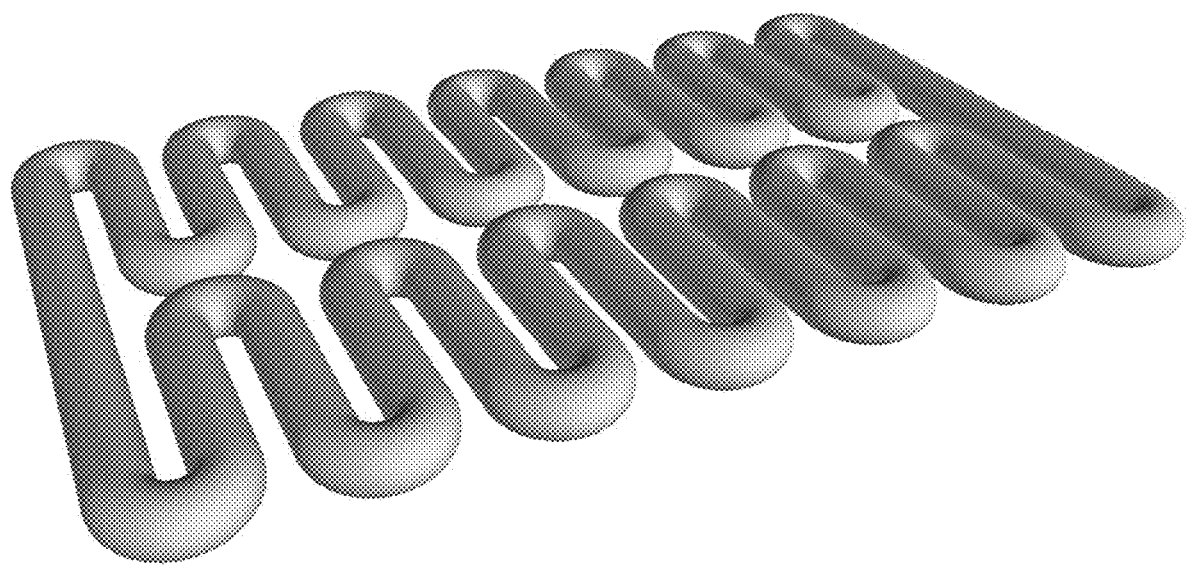
FIG. 1E is a perspective view illustrating a connected, sealed pipe that is bent along a plane, according to an embodiment of the present invention.

Irregular shapes are also possible. For instance, a bent, connected pipe structure 140 is shown in FIG. 1E. For any connected pipe structure with a constant radius R, where the pipe follows a non-intersecting continuous closed path of length L, the surface area-to-volume ratio can be shown to be equivalent to that of a torus (a torus being a special case of this more generally described geometry). The surface area-to-volume ratio of such structures is given by:

$$\frac{SA}{V} = \frac{(2\pi R)L}{(\pi R^2)L} = \frac{2}{R} \tag{7}$$

In some embodiments, different portions of the shape may be wider and thinner. For instance, a pipe, such as that shown in FIG. 1D, may not have the same width at each portion along its length, so long as the overall structure is enclosed and a vacuum can be provided. Also, while pipe 130 only curves along two dimensions, it should be appreciated that the curves may occur in any three-dimensional direction (for instance, an end-connected "spaghetti" shape) so long as the overall structure is enclosed and contains a cavity. Furthermore, the cross-section of the pipe may have different shapes (e.g., square, rectangular, a star, an irregular shape, etc.), and the shape may change in size, shape, or both, in some embodiments from the cross-section at one location to the cross-section at another location. Per the above, any suitable regular or irregular shape may be used, so long as the structure is enclosed and the density of the structure is less than $\rho_{air}$.

Figure 2A:
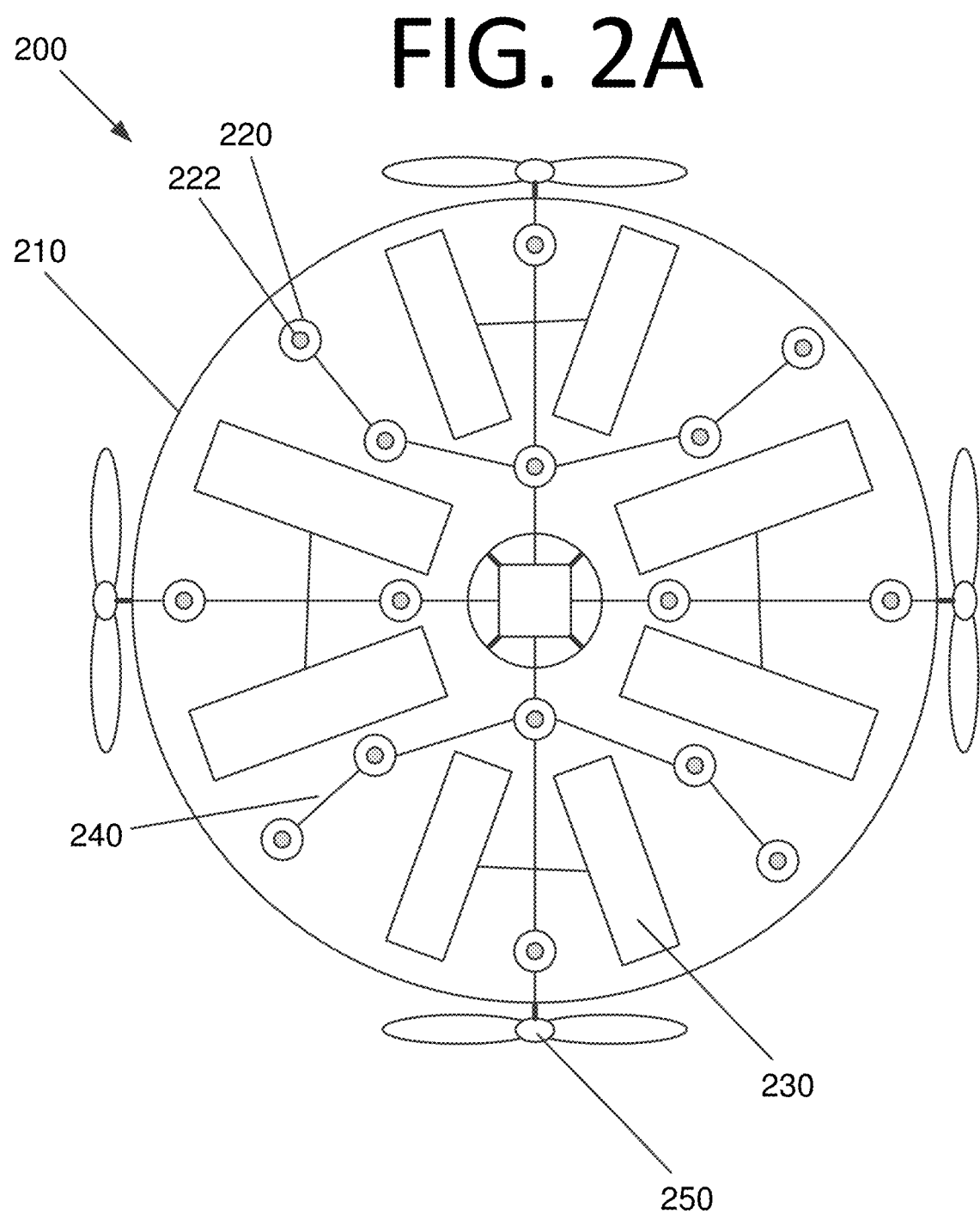
FIG. 2A is a top view illustrating a torus-shaped air-buoyant vehicle, according to an embodiment of the present invention.

Various air-buoyant vehicles may be constructed that utilize evacuated structures. For instance, FIG. 2A is a top view illustrating a torus-shaped air-buoyant vehicle 200, according to an embodiment of the present invention.

Vehicle 200 may be used as a scientific instrument for measuring atmospheric conditions, to perform crop surveillance, or to provide a floating Wi-Fi hotspot or cellular base station, for instance. Vehicle 200 includes a hollow shell 210 that contains a cavity under rough vacuum conditions. Vacuum pumps 220 are configured to pump air out of shell 210 or allow air into shell 210 to control buoyancy via valves 222, enabling vehicle 200 to increase or decrease its altitude. Solar panels 230 provide power for vehicle 200, potentially allowing it to stay aloft indefinitely.

Propellers 250 facilitate horizontal movement of vehicle 200. Since shell 210 provides buoyancy, less power may be required to keep vehicle 200 aloft and to control its position as compared to a quadcopter, for instance. In some embodiments, propellers 250 may be positioned on the top or bottom of vehicle 200, or on the payload. In certain embodiments, propellers (or cyclorotors) 250 may be rotated for more fine control. In certain embodiments, cyclorotors, such as those produced by Pitch Aeronautics™, may be used in place of some or all of the propellers.

Figure 2C:
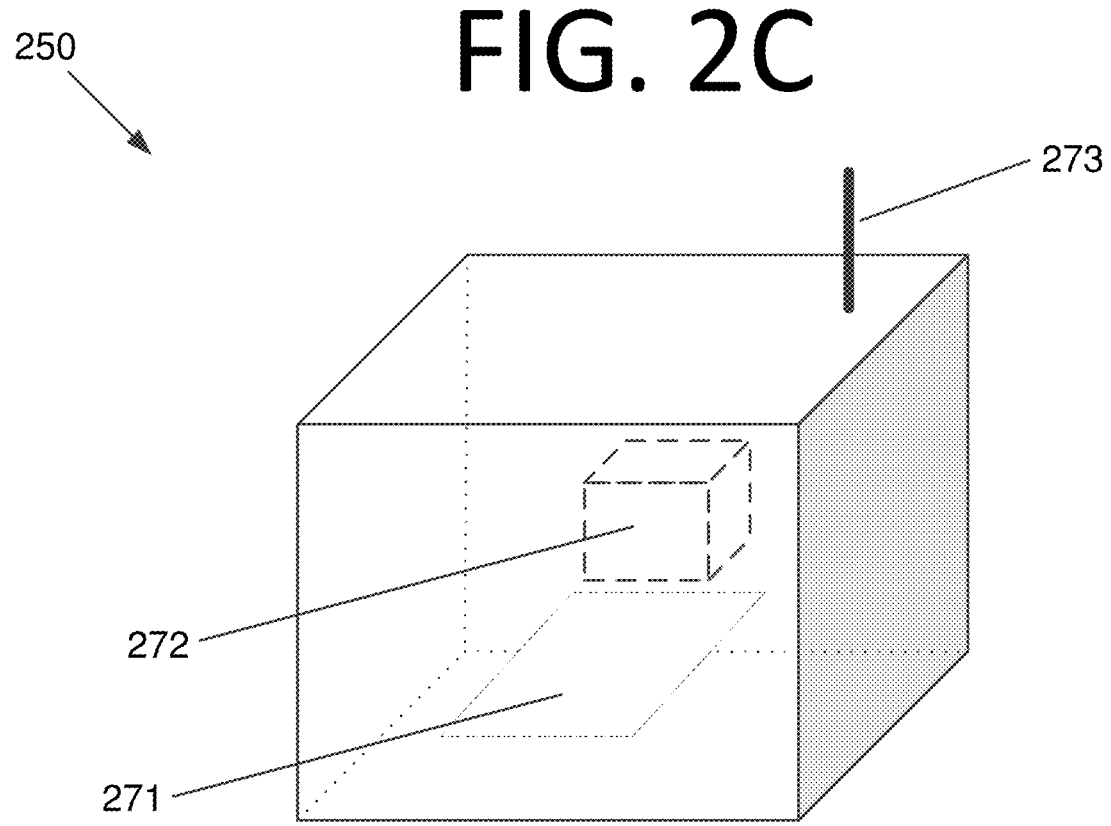
FIG. 2C is a perspective view illustrating the payload, according to an embodiment of the present invention.
Figure 2D:
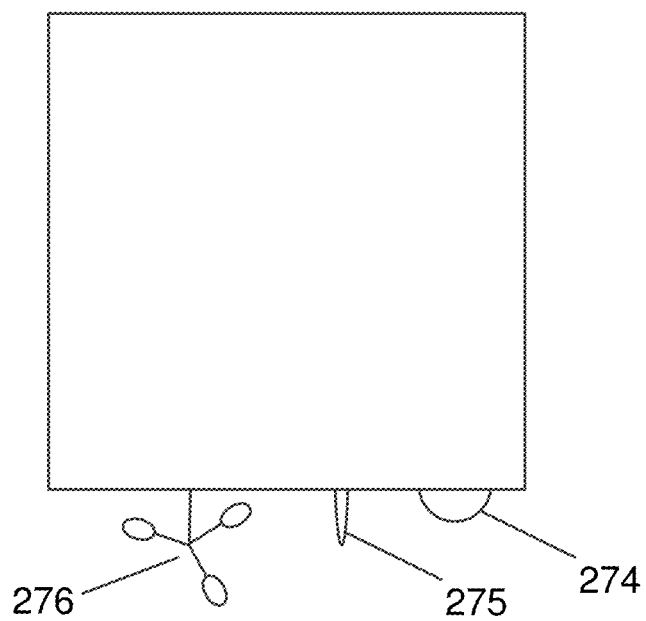
FIG. 2D is a side view illustrating the payload, according to an embodiment of the present invention.

Wires 240 interconnect vacuum pumps 220, solar panels 230, propellers 250, and a payload 270 (see FIGS. 2B-D). Payload 270 can receive power from solar panels 230, batteries, and/or any other suitable power source without deviating from the scope of the invention. Payload 270 can control vacuum pumps 220 and propellers 250 to change its position and altitude. In this embodiment, payload 270 is connected to shell 210 via supports 260. In some embodiments, payloads may be interchangeable so vehicle can support various different missions.

In this embodiment, payload 270 includes control circuitry 271 (e.g., a processor, motherboard, graphics card, transceiver, altimeter, GPS, etc.) and power storage 272 (e.g., a battery, capacitors, etc.) that stores power received from solar panels 230. Control circuitry 271 may include the components shown with respect to computing system 700 of FIG. 7 in some embodiments. Payload 273 also includes an antenna 273. However, in some embodiments, multiple antennas (including low gain and/or high gain antennas) may be used to receive/provide communication at different locations and/or different frequencies.

In the event of cloud cover or nighttime operation, power storage 272 may store sufficient power to operate vehicle 200 until sufficient sunlight is present to charge battery 272. In certain embodiments, control circuitry 271 may place vehicle 200 into a low power mode when battery power is low or sufficient sunlight is unavailable. This low power mode may include reducing power consumption and/or shutting down various circuits, stopping operation of vacuum pumps 220 except as may be required to stay aloft, etc.

Payload 270 may include various instruments, depending on its mission. For instance, if monitoring cloud cover and air currents, payload 270 may include a camera 274, a thermometer 275, an anemometer 276 to measure wind speed, etc. However, any desired instrumentation may be used without deviating from the scope of the invention.

Per the above, applications of air-buoyant, evacuated hollow structures are numerous, and are not limited to "balloons," drones, and the like. Indeed, any number, size, and shape of air-buoyant structures may be used to lift any desired payload or platform. Having multiple structures may keep a payload or platform aloft if one of the structures fails, somewhat similar to the principle of using multiple helium-filled compartments in blimps.

Figure 3A:
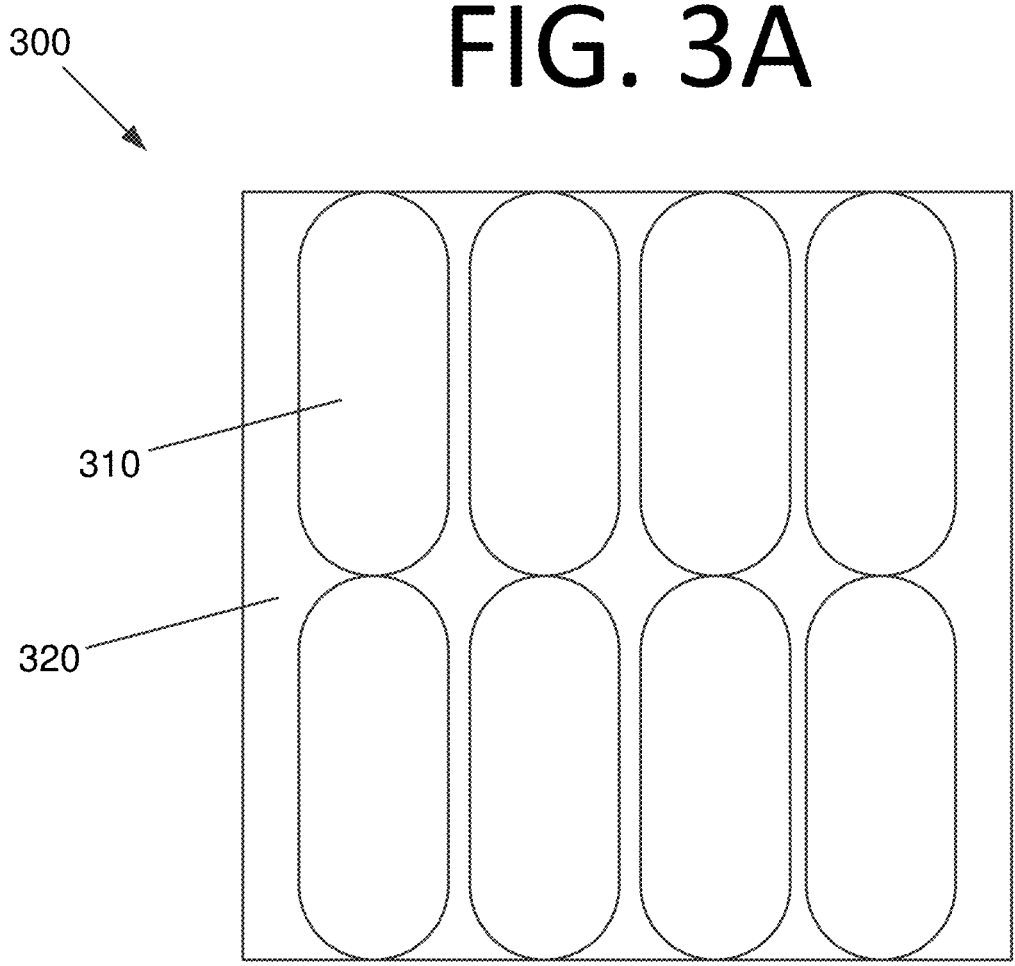
FIG. 3A is a bottom view illustrating a floating platform, according to an embodiment of the present invention.
Figure 3B:
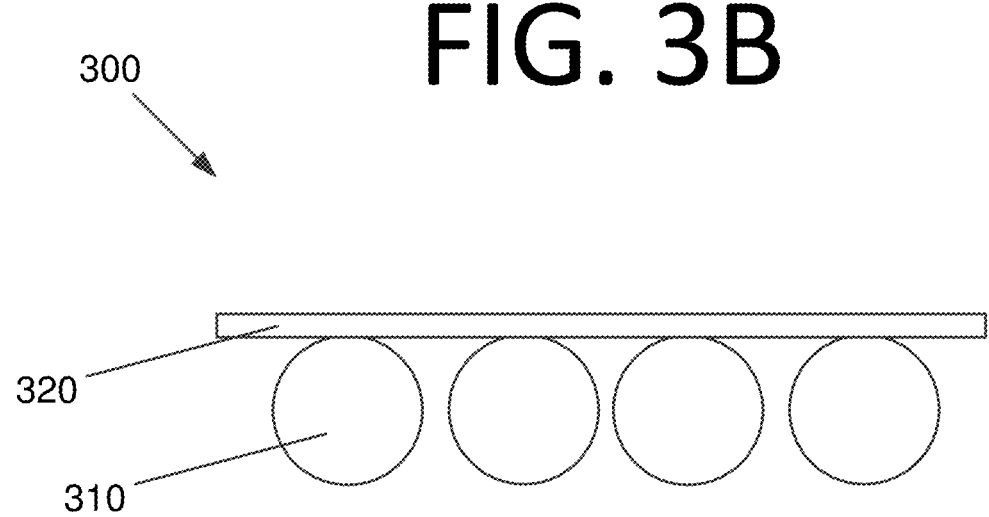
FIG. 3B is a side view illustrating the floating platform of FIG. 3A, according to an embodiment of the present invention.

FIGS. 3A and 3B are a bottom view and a side view, respectively, illustrating a floating platform 300, according to an embodiment of the present invention. Floating platform 300 includes air-buoyant structures 310 and a platform 320 (here, eight air-buoyant structures). These structures would likely be larger in practical implementations, but are shown smaller here to illustrate the general concept.

By having multiple air-buoyant structures 310, floating platform 320 may stay aloft if one air-buoyant structure 310 fails, or at least descend at a relatively slow and safe speed. Floating platform 300 may also have mechanisms to control its position and altitude (e.g., control electronics, propellers, vacuum pumps on air-buoyant structures 310, etc.). Such a floating platform may be used for entertainment purposes. For instance, the platform may have a railing, chairs with seatbelts, and/or any other desired safety equipment to keep passengers safe during operation. Alternatively, a warehouse may be built on platform 320 for floating storage.

Figure 4:
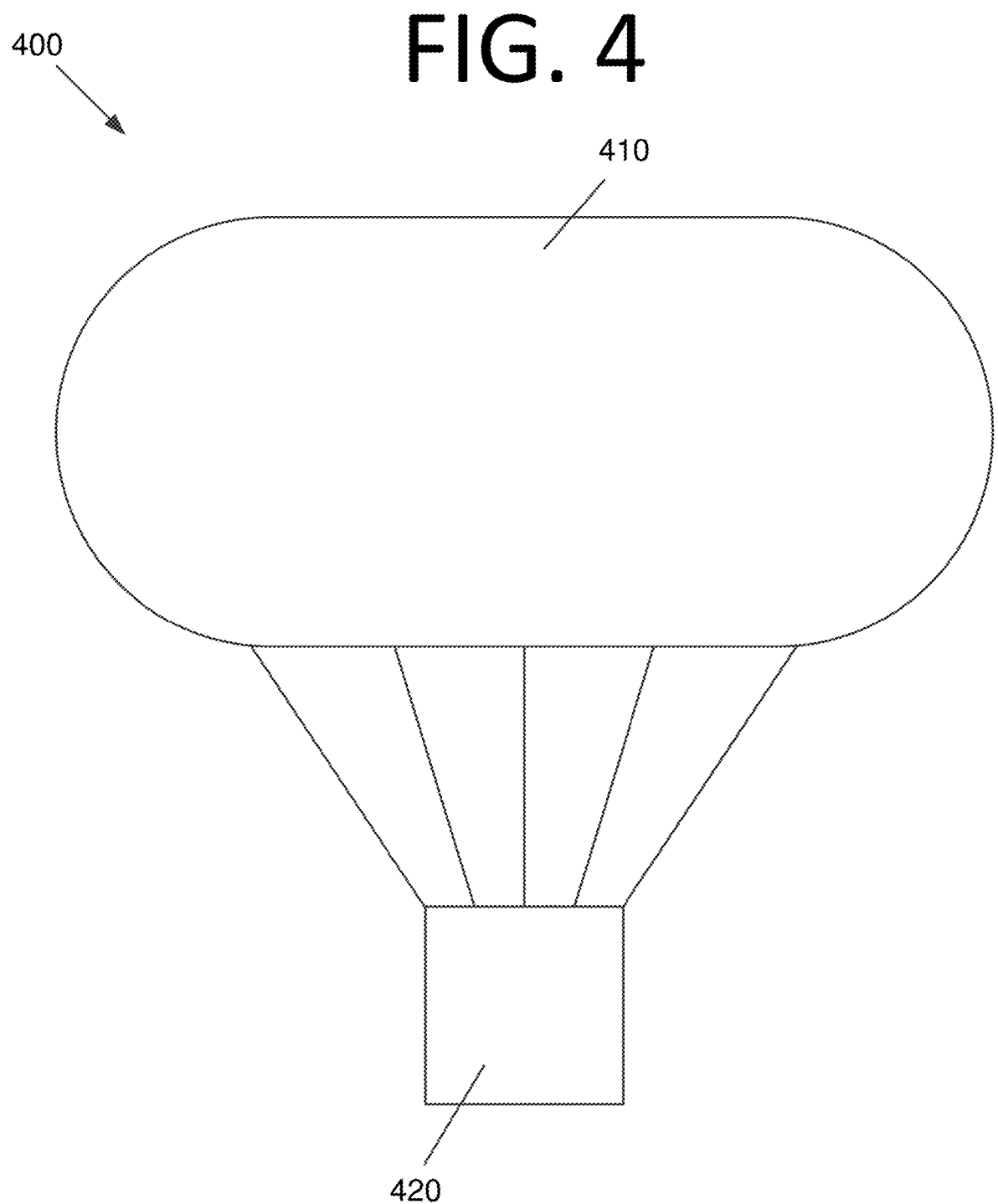
FIG. 4 is a side view illustrating an air-buoyant vehicle with a suspended payload, according to an embodiment of the present invention.

FIG. 4 is a side view illustrating an air-buoyant vehicle 400 that includes an air-buoyant structure 410 and a payload 420 suspended from air-buoyant structure 410, according to an embodiment of the present invention. In this sense, air-buoyant vehicle 400 is conceptually similar to a hot air balloon. However, per the above, air-buoyant structure 410 may stay aloft for a long duration or permanently. Furthermore, air-buoyant structure 410 includes a hollow cavity (not visible), and the hollow cavity is under reduced pressure, rough vacuum, high vacuum, ultra-high vacuum, or extremely high vacuum conditions. In some embodiments, air-buoyant structure may include vacuum pumps and valves (not shown) that pump air out of, or allow air into, air-buoyant structure 410.

While some embodiments at least somewhat resist the crushing force of the atmosphere, in certain embodiments, the air-buoyant structure deforms laterally when evacuated (i.e., the structure "shrinks"). More specifically, hoop stress causes the air-buoyant structure to undergo lateral deformation. For a cylindrical tube, hoop stress, or circumferential stress, is a normal stress in the tangential (azimuth) direction. For a spherical shell, hoop stress is a normal stress in the lateral direction perpendicular to the radial direction. In the process, the air-buoyant structure typically becomes impermeable to air and considerably stronger. It should be noted that the hoop stress is typically significantly larger than atmospheric pressure. While atmospheric pressure at sea level is approximately 14.7 pounds per square inch (psi), hoop stresses are typically hundreds, or even thousands, of psi for a vacuum vessel. Thus, the hoop stress is a considerably more significant pressure variable than atmospheric pressure.

Figure 5:
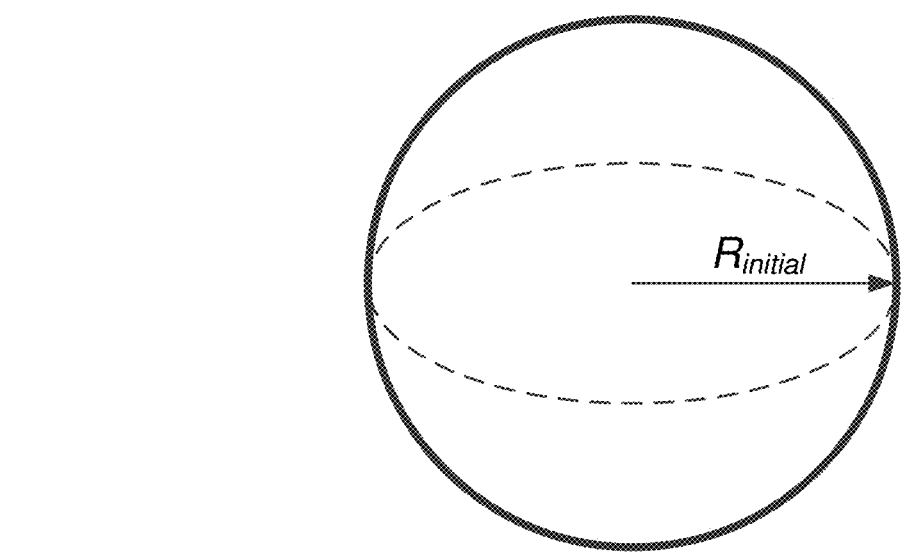
FIG. 5 illustrates a spherical air-buoyant structure before and after evacuation, according to an embodiment of the present invention.
Figure 5:
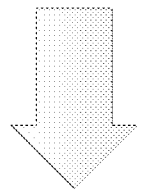
Figure 5:
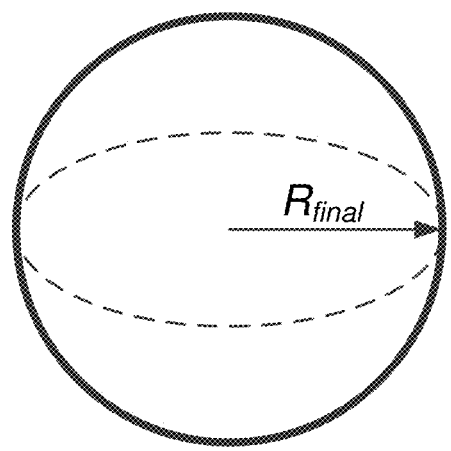

FIG. 5 illustrates a spherical air-buoyant structure 500 before and after evacuation, according to an embodiment of the present invention. As can be seen, air-buoyant structure 500 has a larger size with radius $R_{initial}$ prior to evacuation and a smaller size with radius $R_{final}$ thereafter. In order to achieve an evacuated air-buoyant structure of a target size and density, stress-strain curves for the structure material may be used, where the material density corresponds to a minimum hoop stress. Certain geometries, such as a spherical geometry, may be assumed to be maintained during evacuation and deformative compression.

Assuming no buckling or folding of the structure in on itself and/or tearing apart, all structures will typically deform to be similar to the original shape, but smaller. A spherical shell will typically just become a smaller sphere. A cylindrical tube will typically have a smaller radius (due to hoop stress) and shorter length (due to axial stress). A torus will typically reduce in tube radius similar to the cylinder, but is more complex in its length response. The cylindrical tube would be pressed on its ends by atmospheric pressure, inducing a compressive axial stress, whereas for the torus, there are no ends, but the reduction of tube radius might induce an expansive axial stress closer to the center and compressive axial stress further from the center. Each geometry would need to be considered separately in terms of the stresses induced by atmospheric pressure under evacuation.

Figure 6A:
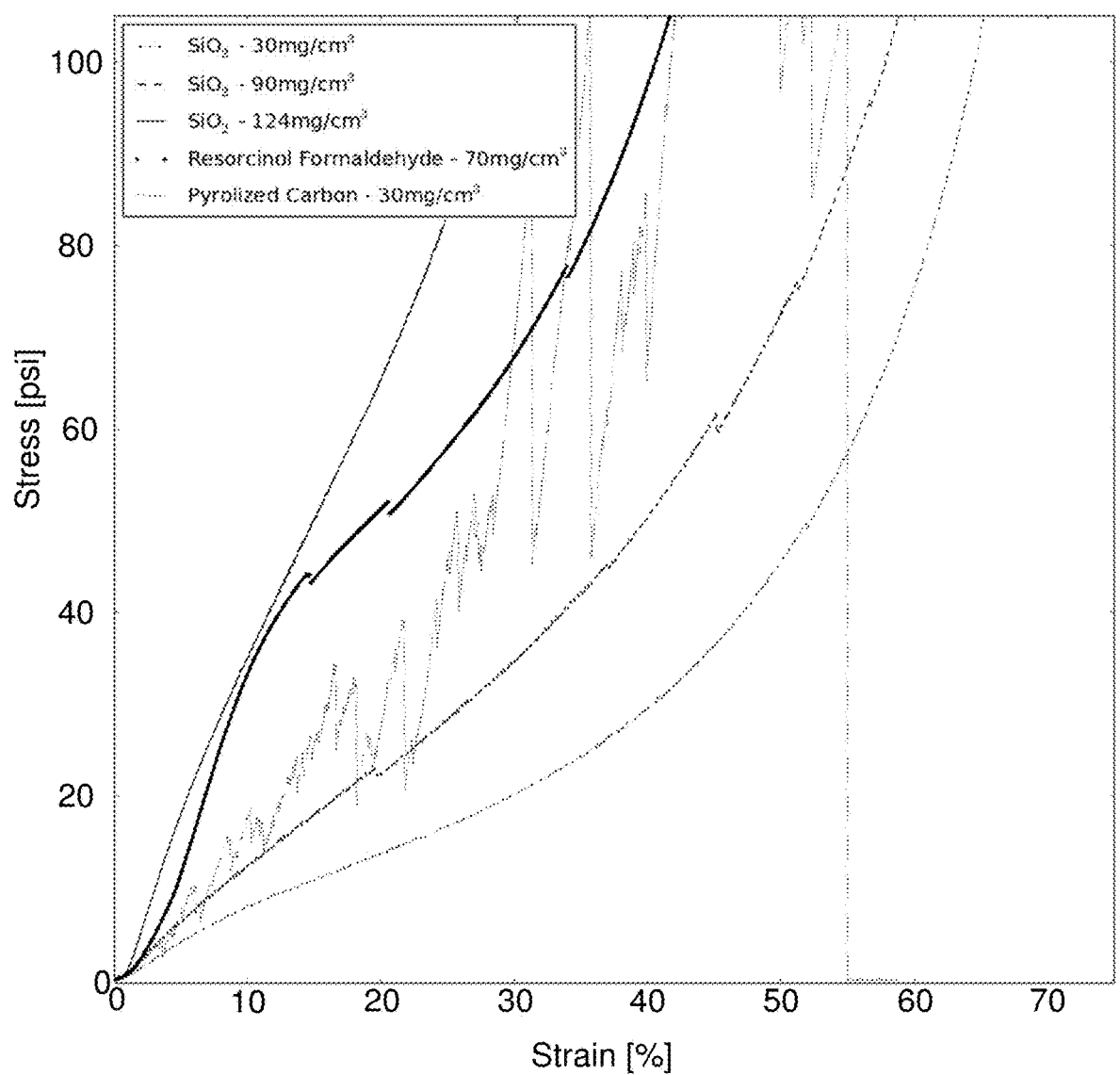
FIG. 6A is a graph illustrating stress versus strain for certain aerogel materials at lower pressures, according to an embodiment of the present invention.
Figure 6B:
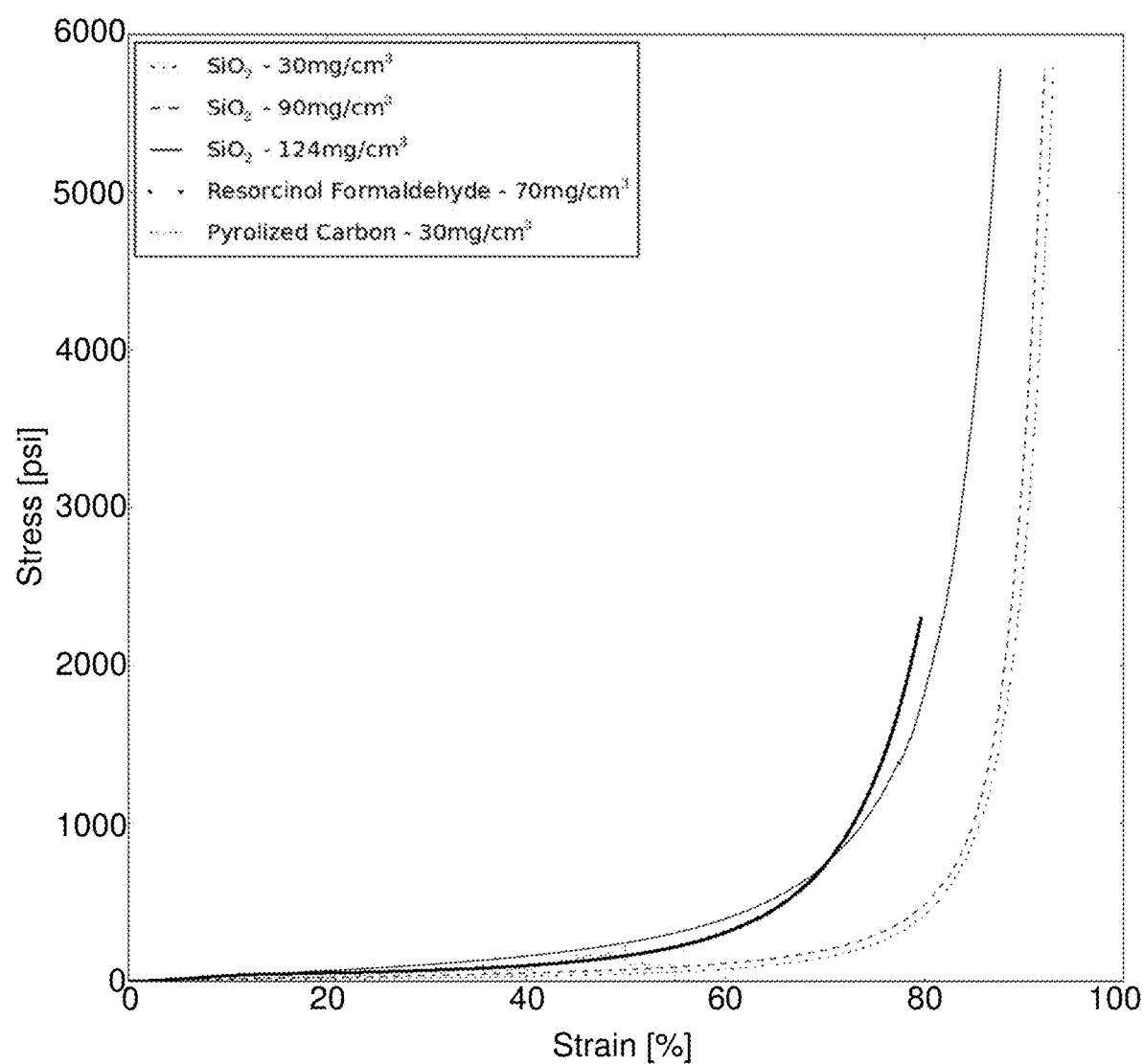
FIG. 6B is a graph illustrating stress versus strain for the aerogel materials of FIG. 6A at higher pressures, according to an embodiment of the present invention.

The Engineered Materials Group at Los Alamos National Laboratory (LANL) has a well-established synthesis infrastructure for ultra-low weight aerogel materials, and regularly produces aerogels with densities as low as ~20 mg/cm$^3$ and over 98% open porosity. From compression testing of these materials, it was demonstrated that they can support loads on the order of thousands of psi, albeit with significant deformation. This can be seen in graphs 600, 610 of FIGS. 6A and 6B, respectively, which illustrate stress versus strain for certain aerogel materials (specifically, $SiO_2$ with a density of 30 mg/cm$^3$, $SiO_2$ with a density of 90 mg/cm$^3$, $SiO_2$ with a density of 124 mg/cm$^3$, resorcinol formaldehyde with a density of 70 mg/cm$^3$, and pyrolized carbon with a density of 30 mg/cm$^3$).

Given the high open porosity of the aerogels, it was assumed that air would flow freely through the material. However, vacuum testing revealed that for certain densities and stiffnesses, these materials actually hold vacuum. It was determined that this observation is due to the collapse of void space near the surface on the vacuum side of the material, resulting in an air-impermeable layer.

Figure 6C:
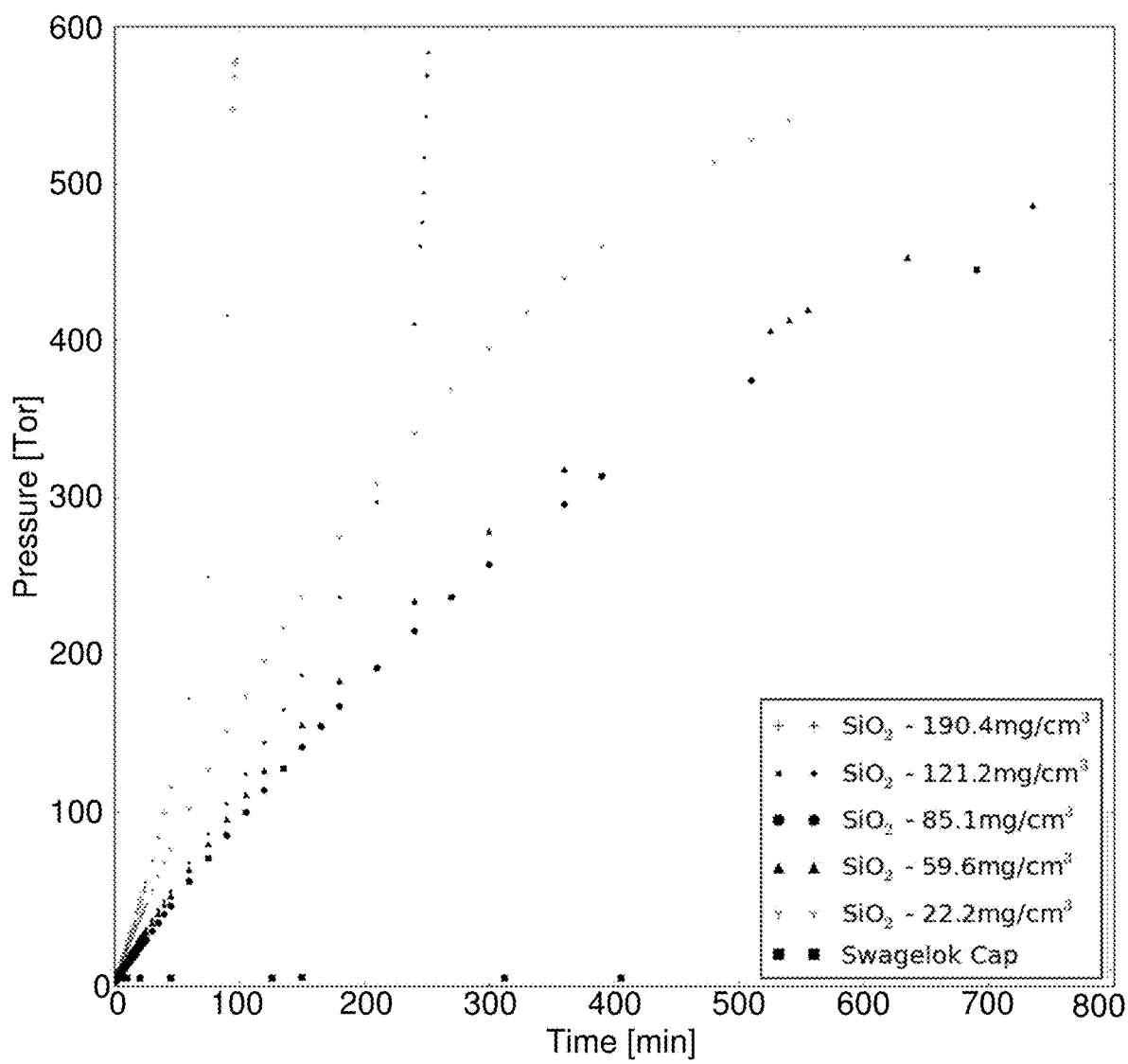
FIG. 6C is a graph illustrating pressure versus time for aerogel materials of various densities, according to an embodiment of the present invention.

Under active pumping, materials exhibiting this behavior could sustain a low vacuum regardless of the range of densities tested. The ability of these materials to hold vacuum once active pumping was discontinued was determined to be density-dependent with the optimum density for silica aerogel being between 121.2 mg/cm$^3$ and 59.6 mg/cm$^3$, as demonstrated in graph 620 of FIG. 6C. The implication for an air-buoyant vacuum vessel is that the additional weight of an air impermeable membrane to the aerogel structure may not be needed.

By way of nonlimiting example, assuming a spherical shell of aerogel material, engineering tables have been produced that show the minimum hoop stresses that must be overcome to achieve air buoyancy for given material densities. An example of such a table is shown in Table 2 below.

TABLE 2

MINIMUM HOOP STRESSES FOR AIR BUOYANCY OF A SPHERICAL SHELL AT AN ALTITUDE OF 36,090 FEET

| Density (mg/cm$^3$): | Minimum Hoop Stress (psi): |
|---|---|
| 20 | 268.9 |
| 30 | 404.2 |
| 40 | 539.5 |
| 50 | 674.8 |
| 60 | 810.1 |
| 70 | 945.4 |
| 80 | 1080.7 |
| 90 | 1216.0 |
| 100 | 1351.3 |
| 110 | 1486.6 |
| 120 | 1621.9 |
| 130 | 1757.2 |
| 140 | 1892.5 |
| 150 | 2027.8 |
| 160 | 2163.1 |
| 170 | 2298.4 |
| 180 | 2433.7 |
| 190 | 2569.0 |

Figure 7:
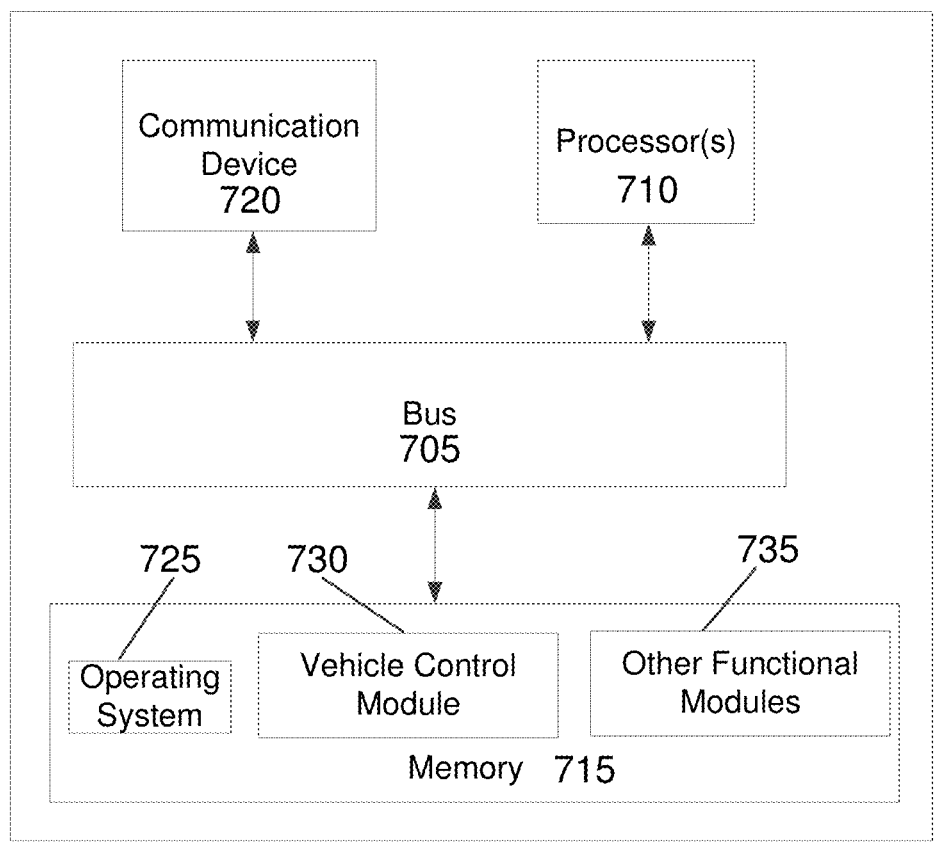
FIG. 7 is a block diagram illustrating a computing system configured to control an air-buoyant vehicle, according to an embodiment of the present invention.

FIG. 7 is a block diagram illustrating a computing system 700 configured to control an air-buoyant vehicle, according to an embodiment of the present invention. Computing system 700 includes a bus 705 or other communication mechanism for communicating information, and processor(s) 710 coupled to bus 705 for processing information. Processor(s) 710 may be any type of general or specific purpose processor, including a central processing unit (CPU), application specific integrated circuit (ASIC), field programmable gate array (FPGA), any combination thereof, etc. Processor(s) 710 may also have multiple processing cores, and at least some of the cores may be configured to perform specific functions. Multi-parallel processing may be used in some embodiments. Computing system 700 further includes a memory 715 for storing information and instructions to be executed by processor(s) 710. Memory 715 can be comprised of any combination of random access memory (RAM), read only memory (ROM), flash memory, cache, static storage such as a magnetic or optical disk, or any other types of non-transitory computer-readable media or combinations thereof. Additionally, computing system 700 includes a communication device 720, such as a transceiver and antenna, to wirelessly provide access to a communications network.

Non-transitory computer-readable media may be any available media that can be accessed by processor(s) 710 and may include volatile media, non-volatile media, or both. The media may be removable, non-removable, or both.

Memory 715 stores software modules that provide functionality when executed by processor(s) 710. The modules include an operating system 725 for computing system 700. The modules further include a vehicle control module 730 that is configured to control a vehicle in accordance with the embodiments discussed herein and derivatives thereof. Computing system 700 may include one or more additional functional modules 735 that include additional functionality.

One skilled in the art will appreciate that a "system" could be embodied as an embedded computing system or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An air-buoyant structure, comprising:
   a shell comprising an aerogel material, a foam material, a vapor-expanded material, or any combination thereof;
   a cavity defined by the shell and located within the shell that is under reduced pressure conditions as compared to atmospheric pressure at a specific altitude; and
   a plurality of vacuum pumps and valves integrated with the shell, wherein
   the plurality of vacuum pumps and valves are configured to maintain the reduced pressure conditions within the cavity by pumping air out of the cavity.

2. The air-buoyant structure of claim 1, wherein the shell is reinforced with helical nanofibers.

3. The air-buoyant structure of claim 1, wherein the plurality of vacuum pumps and valves are configured to pump air out of and allow air into the cavity to control buoyancy of the air-buoyant structure.

4. The air-buoyant structure of claim 1, wherein the plurality of vacuum pumps and valves comprise at least one roughing pump.

5. The air-buoyant structure of claim 1, wherein the air-buoyant structure is operably connected to or included as part of an assembly with one or more other air-buoyant structures.

6. The air-buoyant structure of claim 5, wherein the assembly is an air-buoyant platform.

7. The air-buoyant structure of claim 5, wherein at least two of the air buoyant structures have different shapes.

8. The air-buoyant structure of claim 1, wherein the shell is torus-shaped, pill-shaped, spherical, cylindrical, or a lattice support matrix.

9. The air-buoyant structure of claim 1, wherein the shell is formed from interconnected tubes.

10. The air-buoyant structure of claim 1, wherein the shell is built around a payload.

11. The air-buoyant structure of claim 1, wherein the air-buoyant structure is part of a vehicle.

12. The air-buoyant structure of claim 1, wherein the shell comprises at least one solar panel, at least one propeller and/or at least one cyclorotor, at least one payload, control circuitry, at least one battery, at least one instrument, or any combination thereof.

13. An air-buoyant vehicle, comprising:
    a shell;
    a cavity defined by the shell and located within the shell;
    a plurality of vacuum pumps and valves integrated with the shell, wherein
    the plurality of vacuum pumps and valves are configured to pump air out of and allow air into the cavity to control buoyancy of the shell.

14. The air-buoyant vehicle of claim 13, wherein the air-buoyant vehicle comprises at least one solar panel, at least one propeller and/or at least one cyclorotor, at least one payload, control circuitry, at least one battery, at least one instrument, or any combination thereof.

15. The air-buoyant vehicle of claim 13, further comprising:
    at least one payload.

16. The air-buoyant vehicle of claim 15, wherein the payload is interchangeable such that the air-buoyant vehicle can support different missions.

17. The air-buoyant vehicle of claim 15, wherein the payload is suspended from the shell.

18. An air-buoyant platform, comprising:
- a platform; and
- a plurality of air-buoyant structures operably connected to the platform, wherein
- the plurality of air-buoyant structures, when evacuated, are configured to lift the air-buoyant platform into the air,
- the plurality of air-buoyant structures comprise:
    - a shell comprising an aerogel material, a foam material, a vapor-expanded material, or any combination thereof,
    - a cavity defined by the shell and located within the shell that is under reduced pressure conditions as compared to atmospheric pressure at a specific altitude, and
    - a plurality of vacuum pumps and valves integrated with the shell, and
- the plurality of vacuum pumps and valves are configured to maintain the reduced pressure conditions within the respective cavity by pumping air out of the respective cavity.

19. The air-buoyant structure of claim 1, wherein the shell comprises the aerogel material alone with a density of 0.0011 to 0.5 grams per cubic centimeter (g/cm$^3$).

* * * * *